United States Patent [19]

Bonfils

[11] 4,348,113

[45] Sep. 7, 1982

[54] PROCESS AND APPARATUS FOR ATTENUATING LINEARILY ERRORS IN A RING TYPE LASER RATE GYRO

[75] Inventor: Georges L. A. Bonfils, Velizy Villacoublay, France

[73] Assignee: Societe Francaise d'Equipements pour la Navigation Aerienne, Velizy Villacoublay, France

[21] Appl. No.: 74,716

[22] PCT Filed: Dec. 22, 1978

[86] PCT No.: PCT/FR78/00054

§ 371 Date: Sep. 12, 1979

§ 102(e) Date: Sep. 12, 1979

[87] PCT Pub. No.: WO79/00502

PCT Pub. Date: Aug. 9, 1979

[30] Foreign Application Priority Data

Jan. 13, 1978 [FR] France ............................. 78 00871

[51] Int. Cl.³ .............................................. G01C 19/64
[52] U.S. Cl. .................................................. 356/350
[58] Field of Search ................................ 356/350, 351

[56] References Cited

U.S. PATENT DOCUMENTS 3,533,014 10/1970 Coccoli et al. .
3,581,227 5/1971 Podgorski .
3,786,368 1/1974 Bjorkholm et al. .
4,113,387 9/1978 Shutt ................................... 356/350

OTHER PUBLICATIONS

Aronowitz, F., "The Laser Gyro", pp. 153–163, *Laser Applications*, edited by Ross, M., Academic Press, N.Y. & London, 1971.
Boot, H. A. H. et al., "Ring-Laser Bias Using Reciprocal Optical Components", *Electronics Letters*, vol. 5, No. 15, Jul. 24, 1969, pp. 347–348.

*Primary Examiner*—Vincent P. McGraw
*Attorney, Agent, or Firm*—Browdy and Neimark

[57] ABSTRACT

Procedure for attenuating linearity errors in a ring type laser rate gyro 21 that uses N mirrors 28, 29, 30 arranged in such a way that the laser beams travel along two identical polygons in opposite directions, wherein at least one of the said mirrors that define the trajectory of the two laser beams is made to oscillate angularly with respect to the body of the rate gyro about an axis perpendicular to the plane defined by these two laser beams; the rotational axis of each of the oscillating mirrors preferably being as close as possible to the perpendicular to the mirror being considered that passes through the point of contact of the laser beams with the mirror in question.

11 Claims, 8 Drawing Figures

PROCESS AND APPARATUS FOR ATTENUATING LINEARILY ERRORS IN A RING TYPE LASER RATE GYRO

Specialists in Laser Rate gyros know that, because of certain defects inherent in the construction of these devices (backscatter from the mirrors in particular), the two laser beams rotating in opposite directions will tend to more or less completely couple together.

As a result of this, the beat frequency obtained by using currently known methods, that is, by making a part of each of the two beams colinear, will not be proportional to the speed of rotation of the rate gyro.

However, the representative curve of the beat frequency with respect to the angular speed of rotation of the rate gyro will remain symmetrical with respect to the origin.

Because of this symmetry, the well known principle of linearization by scanning can be used to correct the defect resulting from the coupling of the two laser beams.

The principle of this system of linearization is clearly set out by Mr. ARONOWITZ in "Laser Applications", volume 1, published by Monte Ross Academic Press of New-York and London.

The majority of the known procedures used for attenuating linearity errors in a ring type laser rate gyro consist of linearization by scanning, that is, superimposing a symmetrical angular oscillation onto the angular movement to be measured.

One of the known methods used consists of causing the entire rate gyro assembly to oscillate about an axis parallel to its detection axis.

The disadvantage of this procedure, however, is that a significant amount of energy is necessary to oscillate the rate gyro, in view of the mass that has to be set in motion.

Additionally, the oscillations of such a mass give rise to a significant reaction against the support elements, which can, in turn, transmit unwanted movement to other components in the installation, such as rate gyros or accelerometers for example.

The principal feature of the invention for attenuating linearity errors in a ring type laser rate gyro using N mirrors that are arranged in such a way that the laser beams travel along two identical polygons in opposite directions is the fact that at least one of the N mirrors which determine the trajectory of the laser beams mentioned above is oscillated angularly with respect to the body of the rate gyro, about an axis perpendicular to the plane defined by these beams. The rotation axis of each of the oscillating mirrors being, for preference, as close as possible to the perpendicular to the mirror being considered, that passes through the point where the laser beams come into contact with the mirror in question.

Other characteristics of the invention will become more fully apparent as the description which follows is read in conjunction with the accompanying drawings, in which:

FIG. 1 illustrates as an example, which is not exhaustive, a laser rate gyro with three mirrors, M1, M2, M3, which are arranged on an equilateral triangle.

ABC is the trajectory followed by one laser beam, in one direction and CAB is a similar trajectory followed by a second laser beam in the opposite direction.

Figure 1:
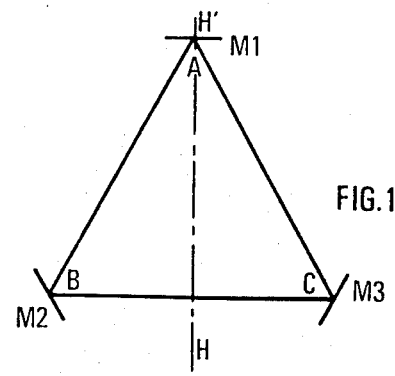
FIG. 1 is a schematic representation of a three-Mirror laser rate gyro, in which, according to the invention, an oscillating motion is given to one or more mirrors.

The detection axis of this rate gyro is perpendicular to the plane of FIG. 1.

In the procedure which is the subject of this invention, Mirror M1 oscillates about an axis which is parallel to the detection axis of the rate gyro.

It will be an advantage if this oscillation axis passes through the plane of the figure close to the line HH' which bisects the angle made by the laser beams reflected by this mirror.

Each of mirrors M2 and/or M3 can also be given an oscillating movement, the respective oscillation axes of which are determined, with respect to each of mirrors M2 or M3, in the same manner as has been described for mirror M1.

Figure 2:
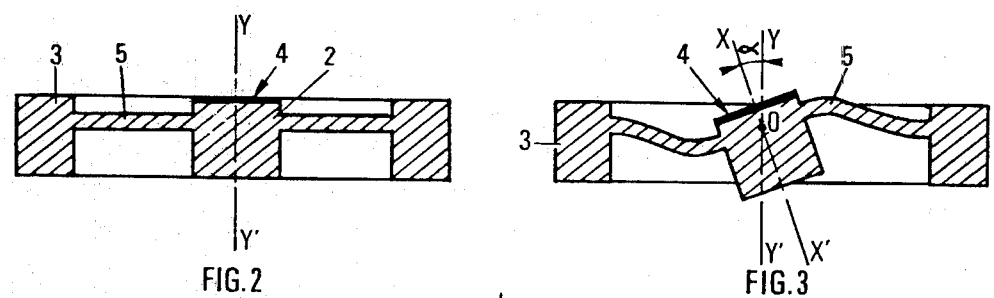
FIGS. 2 and 3 show a method for creating the oscillating mirror.

The assembly shown in FIG. 2 is cylindrical and its rotational axis is YY'. It consists of Support 3, Center Section 2, which incorporates a reflective surface or Mirror 4. Items 2 and 3 mentioned above are held together by flexible Membrane 5, which can, at the same time, act as a waterproof seal, although this is not obligatory. By its construction, Support 3 is attached to body 21 of the rate gyro (see FIG. 8).

Mirror 4 is shown in its normal position with flexible Membrane 5 in a non-deformed state. The axes of Center Section 2 and its associated reflecting surface 4 lie in the same line as the axis of Support 3.

Figure 3:
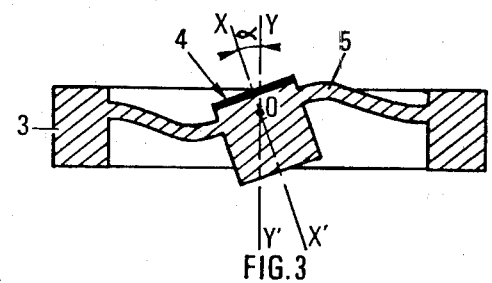

In FIG. 3, mirror 4 is shown in a position where membrane 5 has been deformed by a torque applied to Center Section 2 which causes it to rotate about axis 0, perpendicular to the plane of the figure.

Obviously, the distortion has been highly exaggerated in the illustration to show more clearly the angle made by axis XX' of reflecting surface 4 with axis YY' of Support 3.

Figure 4:
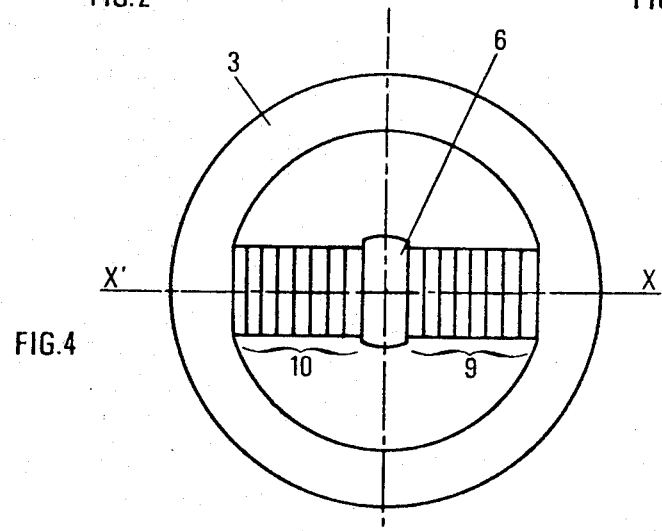
FIGS. 4 and 5 show a method for creating an oscillation generator for oscillating the mirror.
Figure 5:
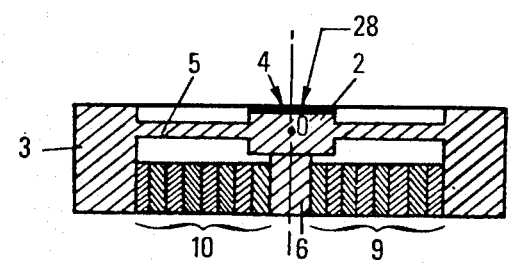

FIGS. 4 and 5 illustrate one method of creating an actuating element or an alternating movement generator which will engender a to-and-fro motion. This element is constituted by a pair of stacked piezoelectric elements 9 and 10. One end of each stack rests on a flat part provided for this purpose on the inside of support 3 mentioned above, the other end being attached to base 6 of mirror 4.

Figure 6:
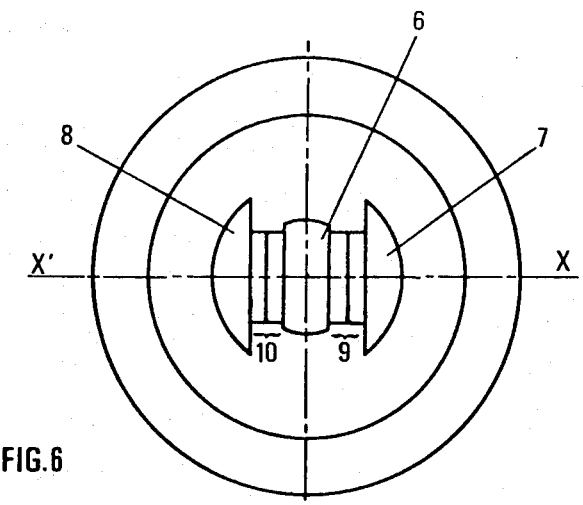
FIGS. 6 and 7 show a variant of the method for creating the above mentioned oscillation generator.
Figure 7:
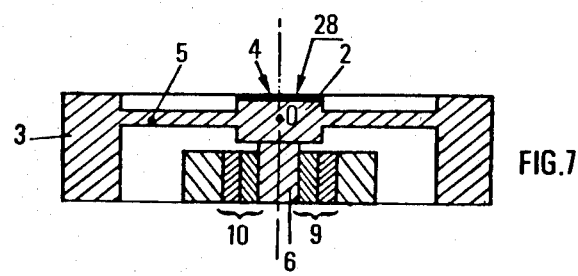

FIGS. 6 and 7 illustrate a variant for creating the oscillating movement generator. Here, it can be seen that fly weights 7 and 8 have been attached to the free end of each piezoelectric stack attached to Base 6.

Figure 8:
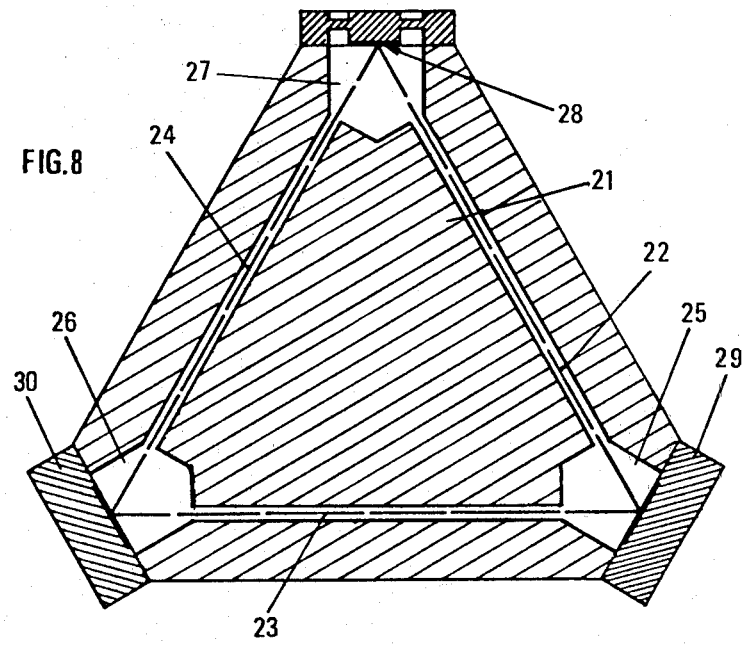
FIG. 8 is an illustration of a ring type laser rate gyro incorporating an oscillating mirror according to the invention.

FIG. 8 shows the body of rate gyro 21, with three capillary channels 22, 23, 24 which lead into three cutouts or recesses 25, 26, 27 that are closed off by mirrors 28, 29 and 30.

In the construction method shown as an example, which is not exhaustive, only Mirror 28 is considered to be oscillating. This mirror as well as the variants in design has been detailed in FIGS. 2 to 7.

It would also be possible to replace each of mirrors 29 and 30 with an equivalent mirror to mirror 28.

The cathodes, anodes and other known elements necessary to the operation of a laser rate gyro, but which do not form part of this invention, have been omitted intentionally.

Principle of Operation of a laser rate gyro according to this invention. According to the procedure which is the subject of this invention, one of the mirrors, Mirror M1 for example, is made to oscillate about an axis which is parallel to the detection axis (therefore perpendicular to the plane of the figure). This axis passes through the plane of the figure at a point which is as close as possible to the line HH' which bisects the internal angle BAC. Calculations of the optical path of the two laser beams, which are not given in this document, have shown us that if the mirror rotates about this axis at a speed $\Omega$, it will engender a symmetrical variation of the optical paths followed by the two laser beams so that the beat frequency obtained due to the interference of the two beams will be, practically equivalent to that which would be obtained by imparting a rotation to the laser rate-gyro block of speed $\Omega/3$. If 2, 3 or N mirrors rotate at a speed $\Omega$, this will be equivalent to a rotation of the rate gyro unit at speeds of $2\Omega/N$, $3\Omega/N$ or $N\Omega/N$ respectively.

As a result, it is possible to obtain linearization by scanning by oscillating this mirror symmetrically with respect to its normal position.

The excitation of the piezoelectric elements is effected in a standard way by an alternating current.

The excitation of piezoelectric element stacks 9 and 10, each having the same initial length L, will have a phase-shift between them of 180° so that, at the instant that the length of stack 9 is changing from its initial length L to length $(L+\Delta L)$, the length of stack 10 is changing from L to $(L-\Delta L)$.

Any random variations in the amplitude or frequency of this oscillation will tend to improve linearization.

It is evident that, it would be possible to envisage oscillating several mirrors simultaneously, in which case the effects would be directly added together if the frequencies and phases of the movements are identical.

In the method of construction illustrated in FIGS. 6 and 7, the rotating movement of the mirror is due to the reaction of the piezoelectric stacks which are attached to the base of the mirror, to transmit the accelerations to the fly weights. Obviously, if the weights of the piezoelectric elements is sufficient, it will be possible to eliminate the fly-weights.

The invention, which has been described here for a 3-mirror annular rate gyro, is also applicable to a laser gyro using four mirrors or more.

It is evident that the displacement generator can be constituted indifferently either by a pair of stacked piezoelectric elements located on either side of base 6 of the center section or by a single stack of elements acting on only one side of the base.

In the laser rate gyros resulting from the application of the procedure described in this invention, the angular movements can be of much lower amplitudes and much higher frequencies than in those procedures where the entire rate gyros assembly is oscillated.

This advantage is due to the very low inertia of the elements in motion.

To situate the contribution that this invention makes in terms of technological results, it is only necessary to compare the frequencies and amplitudes of the old procedure with those of the new procedure:

|  | frequency | amplitude |
|---|---|---|
| known methods | 50 to 200 Hz | 2/10 of a degree or an angle of 15 minutes |
| new method | >10.000 Hz | a few seconds of arc |

It would be possible to use any other type of alternating movement or force generator capable of imparting an angular oscillation to the mirror, without departing from the spirit of this invention.

I claim:

1. Process for attenuating linearily errors in a ring type laser rate gyro that uses N mirrors arranged in such a way that two laser beams travel along two identical polygons in opposite directions, comprising the steps of angularly oscillating at least one of the mirrors that define the trajectories of the two laser beams with respect to the rate gyro body, about an axis perpendicular to a plane defined by said two laser beams; and arranging the rotational axis of each of the oscillating mirrors so as to be as close as possible to the perpendicular to the mirror being considered that passes through the point of contact of the laser beams with the mirror in question.

2. The process of claim 1, further comprising the step of flexibly connecting each oscillating mirror to the body of the rate gyro, threby allowing the mirror in question to be oscillated angularly about the rotational axis defined in claim 1.

3. The process of claim 2, further comprising the step of using a movement generator or actuating element, engendering a to-and-fro motion in said movement generator or actuating element, one end of which bears on the body of the rate gyro while the other end is attached to the base of the mirror.

4. The process of claim 3, further comprising the step of creating a phase oscillation opposed to the oscillation of the said mirror in question.

5. The process of claim 4 in which the free end of actuating element is fitted with an additional mass.

6. Apparatus for attenuating linearity errors in a ring type laser rate gyro having a main body and N mirrors arranged so that two laser beams travel along two identical polygons in opposite directions, comprising an actuating element for oscillating at least one of said mirrors angularly with respect to said main body about an axis perpendicular to a plane defined by said two laser beams, about a rotational axis substantially perpendicular to said oscillating mirror and passing through a point of incidence of said laser beams on said oscillating mirror.

7. The apparatus of claim 6 further comprising a flexible connecting means connecting said oscillating mirror to the main body of said rate gyro for enabling angular oscillation about the rotational axis defined in claim 6.

8. The apparatus of claim 7 wherein one portion of said actuating element is attached to a base of said oscillating mirror.

9. The apparatus of claim 8 wherein another portion of said actuating element bears on the main body of said rate gyro.

10. The apparatus of claim 8 wherein said actuating element includes an unrestrained portion for engendering an inertial reaction to movement of said actuating element thereby creating a phase oscillation opposed to the oscillation of said oscillating mirror.

11. The apparatus of claim 10 further comprising an additional mass attached to said unrestrained portion of said actuating element.

* * * * *